Oct. 31, 1967 W. L. ZEMBERRY 3,349,495
METHOD OF MEASURING SIMULATED FLAWS IN STANDARD SPECIMENS
Filed June 3, 1965

INVENTOR
WILLIAM L. ZEMBERRY
By Donald G. Dalton
Attorney

United States Patent Office 3,349,495
Patented Oct. 31, 1967

3,349,495
METHOD OF MEASURING SIMULATED FLAWS IN STANDARD SPECIMENS
William L. Zemberry, Swissvale, Pa., assignor to United States Steel Corporation, a corporation of Delaware
Filed June 3, 1965, Ser. No. 461,119
4 Claims. (Cl. 33—125)

This invention relates to an improved method of measuring simulated flaws in standard specimens used in flaw detection work.

Certain types of metal products are inspected for internal discontinuities by ultrasonic, eddy-current, fringe-flux or analogous systems. Before actually inspecting the product, the inspector must adjust the test equipment to the desired sensitivity, using standard specimens which contain simulated flaws of known dimensions. Machines are available commercially for cutting extremely thin shallow simulated flaws in specimens to be used as standards. Such machines include a movable electrode shim which penetrates the specimen, and means for striking an arc between the electrode and specimen. The machine is equipped with a micrometer which measures the distance the electrode travels in penetrating the specimen, but this measurement alone is not a direct indication of the flaw depth. Physical measurement of the simulated flaw without destroying the specimen usually is impractical because of the extremely narrow width of the flaw. Heretofore the operator has cut a simulated flaw to approximately the desired depth, sectioned the specimen through the flaw (thereby destroying the specimen), and measured the flaw depth under a microscope. After several trials the operator learned the distance of travel required for cutting flaws of different depths in the particular metal with which he was working. This practice is unduly time-consuming and costly and must be repeated for metals of each different composition or grain structure of which specimens are needed. It is not altogether accurate for the reason that specimens nominally having the same characteristics actually vary within limits.

An object of the present invention is to provide an improved method by which I can measure the depth of a simulated flaw quickly and accurately and avoid destroying specimens.

A further object is to provide a measuring method which I can use with conventional flaw-cutting machines for quickly determining the flaw depth by measuring the effect on the electrode.

Figure 1:
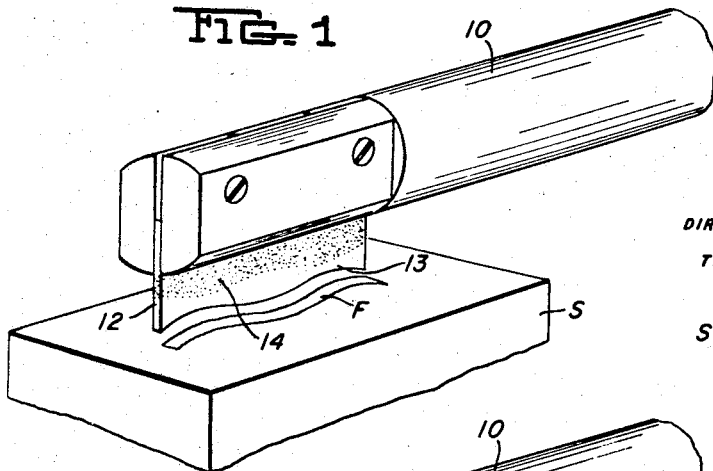
FIGURE 1 is a perspective view of a specimen and electrode for cutting a simulated flaw, with irregularities and widths shown exaggerated.
Figure 2:
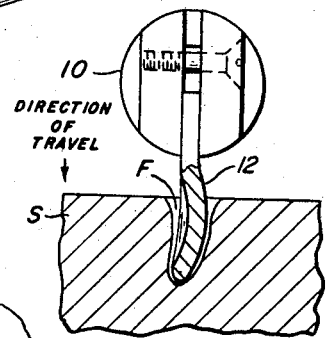
FIGURE 2 is an end elevational view of the structure shown in FIGURE 1 with parts broken away and similarly exaggerated.
Figure 3:
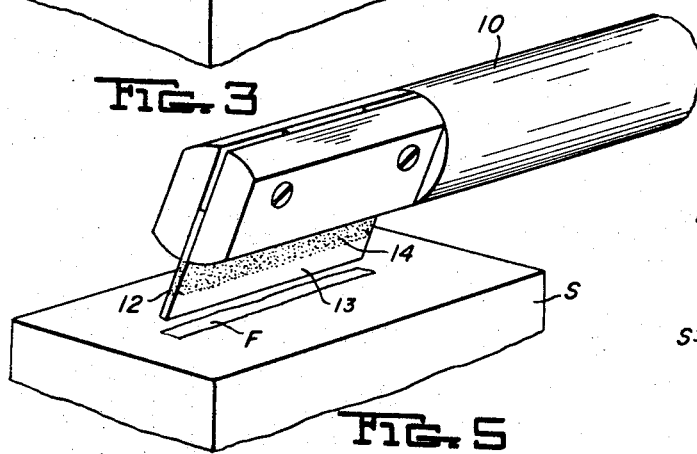
FIGURE 3 is a perspective view of a specimen and electrode illustrating a modified procedure for cutting the flaw exaggerated like FIGURE 1.
Figure 4:
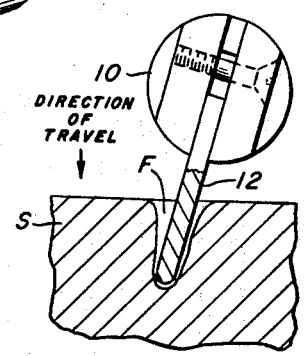
FIGURE 4 is an end elevational view of the structure shown in FIGURE 3 with parts broken away and similarly exaggerated.

FIGURES 1 and 3 show an electrode arm 10 which carries a thin electrode shim 12. The arm forms part of a conventional machine for cutting a simulated flaw F in a metal specimen S. The figures show the shim and flaw exaggerated in order to illustrate a condition which can develop with very thin shims despite extreme care. The material of the shim is relatively soft, and normal cutting and handling imparts slight waves into its surface. Since these waves do not affect the quality of the work and it is not possible to remove them by any simple procedure, they are allowed to remain. The machine also includes a mechanism for feeding the arm vertically downwardly, a micrometer which indicates the distance the shim travels, and electrical connections which transmit arc current to the arm and specimen. Since my invention does not involve these other parts of the machine, in the interest of simplicity I have not shown them. As the machine cuts the flaw F, the shim penetrates the opening, but the penetration usually is not straight. The shim may bend (FIGURE 2) or it may inadvertently be sloped a few degrees from the vertical during the setting up operation (FIGURE 4). At the same time material of the shim burns away. Hence the distance the shim travels in cutting the flaw as indicated on the micrometer is not a measure of the flaw depth.

The portion of the shim 12 which penetrates the specimen S becomes visibly etched on both sides, as indicated at 13. In accordance with my invention, I measure the height of etched area of the shim with a conventional magnifying apparatus, such as a Bausch and Lomb metallograph. To facilitate taking this measurement, preferably I coat the sides of the shim with metal bluing 14 before using the shim. In this manner the contrast between the etched and unetched areas is more distinct. It is customary to use a new shim for each cut. Thus every cut has its own record imprinted on a shim. The shim can be identified with the flaw it has cut by inserting it in the flaw and observing whether it fits.

As FIGURES 2 and 4 show, the flaw F always is wider at its top than at its bottom. The upper portion of the etched area 13 of the shim is not subject to the etching action for as long a period as the portions farther down and the etching is not as pronounced. Hence the height of the etched area 13 still is not a direct measurement of the flaw depth. Nevertheless, I have discovered that the numerical difference between the height measurement and the true depth is a linear function of the distance which the shim travels in cutting the flaw, as long as other conditions remain the same.

By a calibration process I determine correction factors which I can apply to the height measurement to obtain an accurate measurement of the flaw depth. I cut a series of flaws F in specimens S of the same metal using a constant voltage and noting in each instance the distance of shim travel, as indicated on the micrometer of the cutting machine. I then measure the actual depth of these flaws, for example by sectioning the specimens. I also measure the height of the etched areas 13 of the shims 12. Preferably I measure the height of the etched areas on both sides of a shim near each end and near the middle. I average the higher of the two measurements at one end, the higher of the two measurements at the middle, and the higher of the two measurements at the other end. Using this average as my height measurement, I plot the distance of shim travel against the difference between the actual flaw depth and the height measurement. To measure the depth of subsequent cuts, I need only measure the height of the etched area taking the average as before, note the distance of shim travel, and apply the proper correction factor to the height measurement as taken from the plot.

Figure 5:
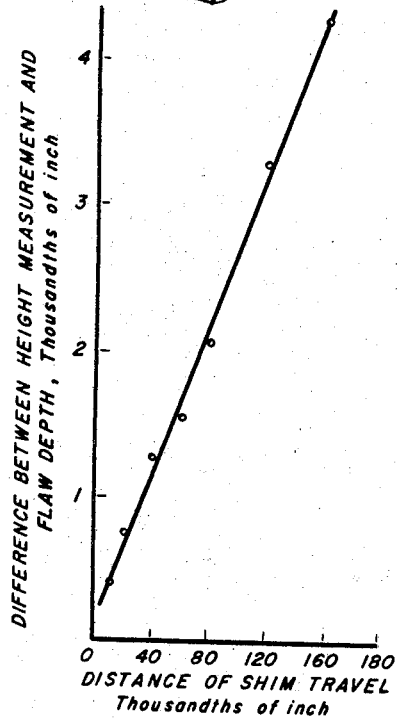
FIGURE 5 is a graph showing the correction factors which I use in adjusting the measured depth to its true value.

FIGURE 5 is an example of the type of plot I obtain in my calibration process. In this instance I used a mild steel specimen and a brass shim 0.005 inch thick by 2 inches long, and I cut at 120 volts vertically as shown in FIGURES 1 and 2. As the distances of shim travel ranged from 0.010 to 0.160 inch, the numerical differences between the height measurements and the true depths increased linearly from about 0.004 to 0.0042 inch. I add the corresponding difference to the height measurement as taken from the shim to obtain an accurate measurement of the flaw depth.

To check the accuracy of a measurement using the graph of FIGURE 5, I cut another flaw under the same conditions to an intended depth of 0.0219 inch. I found the actual depth, as determined by sectioning the specimen, to be 0.0220 inch. The distance of electrode shim travel was 0.052 inch. I measured the etched area of the shim with the following results:

|  | Fore, in. | Middle, in. | Aft, in. |
|---|---|---|---|
| Height on front of shim | 0.0204 | 0.0164 | 0.0180 |
| Height on back of shim | 0.0191 | 0.0195 | 0.0186 |
| Average of higher measurements |  | 0.0195 |  |

These measurements indicate that the shim was in the condition illustrated in FIGURE 1 where the high points of the etched areas alternate from front to back. From FIGURE 5, the correction factor is 0.0015 inch. Adding this factor to the height measurement, I obtain a flaw depth of 0.0210 inch, which is accurate to within one one-thousandth of an inch.

From the foregoing description it is seen that my invention affords a simple method of determining the true depth of a simulated flaw without destroying the specimen, once the necessary calibration has been obtained. In a copending application, S.N. 455,858 filed May 14, 1965, I have shown and claimed another method and device for measuring flaw depth without destroying specimens, but which is applicable only to measuring flaws cut in the exterior of a specimen. The method of the present invention can be used for measuring flaws cut on the inside of a tubular specimen, as well as the exterior. I can of course use the method and apparatus shown in the other application to calibrate for the present invention, thereby altogether avoiding destruction of specimens. By using my method it is possible to certify to purchasers of inspected products that the specimen used to calibrate the test equipment meets specifications for depth and profile.

While I have shown and described certain preferred embodiments of my invention, it is apparent that modifications may arise. Therefore, I do not wish to be limited to the disclosure set forth but only by the scope of the appended claims.

I claim:

1. In an operation in which a simulated flaw is cut in a specimen to be used as a standard, wherein the flaw is cut with an electrode shim, a portion of which penetrates the specimen as it cuts and becomes visibly etched, the combination therewith of a method of measuring the flaw depth, comprising measuring the distance the shim travels in penetrating the specimen, measuring the height of the etched area of the shim, and adding to the height measurement a correction factor which is a linear function of the distance of shim travel.

2. A method as defined in claim 1 in which the sides of the shim are coated with metal bluing before cutting the flaw to increase the contrast between etched and unetched areas.

3. A method as defined in claim 1 in which the height measurement is an average of three measurements, said measurements being taken at one end, at the middle, and at the other end of the shim, both sides of the shim being measured at each location and the higher of these measurements being used in determining the average.

4. A method as defined in claim 1 in which said factor is determined by plotting the distance of shim travel against the difference between the actual flaw depth and the height measurement.

References Cited

UNITED STATES PATENTS

| | | | |
|---|---|---|---|
| 2,813,966 | 11/1957 | Matulaitis | 219—69 |
| 2,901,828 | 9/1959 | Dunn | 33—125 |
| 2,989,693 | 6/1961 | Foerster | 324—40 |
| 3,050,678 | 8/1962 | Datt | 324—37 |

ROBERT B. HULL, *Primary Examiner.*